United States Patent [19]
Park et al.

[11] Patent Number: 5,527,573
[45] Date of Patent: Jun. 18, 1996

[54] EXTRUDED CLOSED-CELL POLYPROPYLENE FOAM

[75] Inventors: Chung P. Park, Pickerington; Bruce A. Malone, Granville, both of Ohio

[73] Assignee: The Dow Chemical Company, Midland, Mich.

[21] Appl. No.: 259,375

[22] Filed: Jun. 4, 1994

Related U.S. Application Data

[63] Continuation of Ser. No. 987,984, Dec. 9, 1992, abandoned, which is a continuation-in-part of Ser. No. 716,034, Jun. 17, 1991, abandoned.

[51] Int. Cl.$^6$ ............................................. C08J 9/14
[52] U.S. Cl. .................... 428/314.8; 428/314.4; 428/315.7; 428/319.3; 428/319.7
[58] Field of Search .................. 428/314.4, 314.8, 428/315.7, 319.3, 319.7

[56] References Cited

U.S. PATENT DOCUMENTS

| | | | |
|---|---|---|---|
| 3,481,455 | 12/1969 | Graham et al. | 264/50 |
| 3,637,458 | 1/1972 | Parrish | 264/55 |
| 3,846,349 | 11/1974 | Harada et al. | 521/134 |
| 3,871,897 | 3/1975 | Ealding | 117/15 |
| 3,932,569 | 1/1976 | Fuss | 264/51 |
| 4,298,706 | 11/1981 | Ueno et al. | 264/53 |
| 4,323,528 | 4/1982 | Collins | 264/DIG. 66 |
| 4,424,287 | 1/1984 | Johnson et al. | 264/50 |
| 4,522,955 | 6/1985 | Fukushima et al. | 264/53 |
| 4,714,716 | 12/1987 | Park | 264/53 |
| 4,725,466 | 2/1988 | Crass et al. | 428/215 |
| 4,824,720 | 4/1989 | Malone | 264/53 |
| 4,832,770 | 5/1989 | Nojiri et al. | 156/78 |
| 5,116,881 | 5/1992 | Park et al. | 521/143 |

FOREIGN PATENT DOCUMENTS

WO92/16363  10/1992  WIPO.

*Primary Examiner*—Marion E. McCamish
*Assistant Examiner*—Kathleen L. Choi

[57] ABSTRACT

A closed-cell polypropylene foam, with at least eighty percent closed cells and a foamability characteristic of less than about 1.8 is disclosed. Also disclosed are several methods for making such closed-cell polypropylene foams.

7 Claims, 1 Drawing Sheet

FIG. 1

EXTRUDED CLOSED-CELL POLYPROPYLENE FOAM

CROSS-REFERENCE TO RELATED APPLICATIONS

This application is a continuation of application Ser. No. 07/987,984 filed Dec. 9, 1992, now abandoned, which is a continuation-in-part of Ser. No. 07/716,034 filed Jun. 17, 1991, now abandoned.

BACKGROUND OF THE INVENTION

The present invention relates to extruded closed-cell polypropylene foam. The present invention also relates to several methods for making this extruded closed-cell polypropylene foam.

The polypropylene foam of the present invention has uniform and fine closed cell structure.

Since polypropylene generally has a high crystallinity and a low melt viscosity and is difficult to cross-link, it has hitherto been quite difficult to obtain a highly expanded product therefrom. One such kind of product is radiation-crosslinked foam-sheet.

However, since polypropylene is superior to polyethylene in heat resistance, polypropylene is expected to become useful in the field requiring a heat resistance of 100 degrees centigrade or higher, such as heat-insulating material for hot water piping, if a highly expanded product can be obtained therefrom with relative inexpensiveness by the non-crosslinking extrusion foaming process similarly to polyethylene.

Also, the foamed closed-cell polypropylene products of the present invention have good cushioning properties at low densities.

Closed-cell polypropylene foams, like polyethylene foams, could be widely employed in the field of packaging in order to provide cushion properties. Fragile objects intended to be transported may be encased and supported in a closed cell foamed polypropylene cushion adapted to conform to the external shape of the object for which protection is desired. One consideration when providing cushioning is shipping costs. Larger thicknesses of cushioning foam result in excess packaging sizes and concomitant elevated shipping costs. So it is desirable to reduce density of the cushioning material to a minimum while retaining the necessary cushioning properties.

In U.S. Pat. No. 4,522,955 (GB 2,099,434) there is disclosed an extrusion process for highly expanded polypropylene resin foams. These specific polypropylene resin foams use a polypropylene resin having at a stated temperature a minimum value of melt tension and a stated upper limit for a maximum/minimum ratio of melt tension. More specifically, for this non-crosslinking extrusion process, in addition to the ingredients of polypropylene resin and volatile foaming agent, it is required that a nucleus-forming agent, such as inorganic substances, carbon dioxide generators, inorganic or organic acids and thermal type decomposition type chemical foaming agents, be included as part of the mixture to form the polypropylene resin foams of this disclosure.

The present invention is directed to extruded closed-cell polypropylene resin foams, produced with and without a nucleus-forming agent.

The present invention is also directed to extrusion methods of making these closed-cell polypropylene resin foams with and without a nucleus-forming agent.

SUMMARY OF THE INVENTION

The present invention is a closed-cell foamed propylene resin having at least about eighty percent (80%) closed-cells and a foamability characteristic of less than about 1.8.

The present invention also includes processes for making such closed-cell foamed propylene resin. The process consists of feeding a polypropylene resin, having a melt flow index less than about 10 decigrams/minute at 230 degrees centigrade into a continuous melting device to form a polypropylene resin melt, then adding the volatile foaming or blowing agent(s) into the melted polypropylene resin, uniformly mixing the blowing agent and melted resin to form a mixture, cooling the mixture to a (foam) forming temperature, discharging the mixture into a zone of lower pressure and forming the closed-cell foamed propylene resin product having a foamability characteristic (F) of less than or equal to about 1.8.

A similar method for producing a closed-cell lightly crosslinked foamed propylene resin includes the step of feeding azido functional silanes, vinyl functional silanes, organic peroxides, multifunctional vinyl monomers or mixtures of these compounds as a crosslinking agent into the melted resin.

DETAILED DESCRIPTION OF THE INVENTION

The closed-cell polypropylene resin foams of the present invention are those foams having a density of less than 5 pounds per cubic foot. Preferably these foams have a cell size less than about 4 millimeters (mm) and greater than about 0.05 mm.

These foams may be prepared in a conventionally known manner by characterized by feeding, into an extruder, a polypropylene resin having a melt flow index less than 10 decigrams/minute optionally adding a nucleating agent, melting and plasticizing the polypropylene resins thereafter feeding a volatile foaming agent, uniformly mixing the materials, and then extruding the mixture to a low pressure zone while cooling it and forming a polypropylene resin foam product.

Others suitable processes are a coalesced foam process as described in U.S. Pat. No. 4,824,720 and an accumulating extrusion process described in U.S. Pat. No. 4,323,528, both hereby incorporated by reference.

U.S. Pat. No. 4,824,720, which describes the coalesced (or strand) foam process, is hereby incorporated by reference. This patent describes a method for providing a closed cell foam structure comprising a plurality of coalesced extruded strands or profiles by extrusion foaming of a molten thermoplastic composition utilizing a die containing a multiplicity of orifices. The orfices are so arranged such that the contact between adjacent streams of the molten extrudate occurs during the foaming process and the contacting surfaces adhere to one another with sufficient adhesion to result in a unitary structure. The individual strands of coalesced polyolefin foam should remain adhered into a unitary structure to prevent strand delamination under stresses encountered in preparing, shaping, and using the foam.

U.S. Pat. No. 4,323,528 describes an accumulating extrusion process and also is hereby incorporated by reference. In this accumulating extrusion process low density, elongated cellular bodies having large lateral cross-sectional areas are prepared by: 1) forming, under pressure, a mixture of a thermoplastic polymer and a blowing agent, with the mixture having a temperature at which the viscosity of the mixture is sufficient to retain the blowing agent when the mixture is allowed to expand; 2) extruding the mixture into a holding zone maintained at a temperature and pressure which does not allow the mixture to foam, the holding zone having an outlet die defining an orifice opening into a zone of lower pressure at which the mixture foams, and an openable gate closing the die orifice; 3) periodically opening the gate; 4) substantially concurrently applying mechanical pressure by a movable ram on the mixture to eject the mixture from the holding zone through the die orifice into the zone of lower pressure, at a rate greater than that at which substantial foaming in the die orifice occurs and less than that at which substantial irregularities in cross-sectional area or shape occurs; and 5) permitting the ejected mixture to expand unrestrained in at least one dimension to produce an elongated thermoplastic cellular body.

As used herein, "propylene polymer material" means propylene polymer material selected from the group consisting of (a) homopolymers of propylene, (b) random and block copolymers of propylene and an olefin selected from the group consisting of ethylene, C4–C10 1-olefins, and C4–C10 dienes, provided that, when said olefin is ethylene, the maximum polymerized ethylene content is less than about 20% by weight, when said olefin is a C4–C10 1-olefin, the maximum polymerized content thereof is less than about 20% by weighty and when said olefin is a C4–C10 diene, the maximum polymerized content thereof is less than about 20% by weight, and (c) random terpolymers of propylene and 1-olefins selected from the group consisting of ethylene and C4–C8 1-olefins, provided that the maximum polymerized C4–C8 1-olefin content is less than about 20% by weight, and when ethylene is one of said 1-olefins, the maximum polymerized ethylene content is less than about 20% by weight. The C4–C10 1-olefins include the linear and branched C4–C10 1-olefins such as, for examples 1-butene, isobutylene, 1-pentene, 3-methyl- 1-butene, 1-hexene, 3,4-dimethyl- 1-butene, 1-heptene, 3-methyl- 1-hexene, and the like. Examples of C4–C10 dienes include 1,3-butadiene, 1,4-pentadiene, isoprene, 1,5-hexadiene, 2,3-dimethyl-1,3-hexadiene, and the like. The propylene polymer material must have at least eighty percent (80%) percent polypropylene in the propylene polymer material.

Apart from the above, other polymeric substances with the above-mentioned polypropylene type resins, such as high- and low-density polyethylenes, polybutene-1, ethylene-vinyl acetate copolymer, ethylene-propylene rubber, styrene-butadiene rubber, ethylene-ethyl acrylate copolymer, ionomer and the like, may be mixed into the above-mentioned polypropylene type resins either alone or in the form of a blend of two or more polymers, so long as polypropylene is the main component in the resulting mixture and the mixture is of uniform quality.

Also, as used herein, the propylene polymer material has a weight average molecular weight of at least about 100,000.

The preferred polypropylene resins for the present invention are those polypropylene resins which are branched or lightly cross-linked polymer materials. Branching (or light cross-linking) may be obtained by those methods generally known in the arty such as chemical or irradiation branching/light cross-linking. One such resin which is prepared as a branched/lightly cross-linked polypropylene resin prior to using the polypropylene resin to prepare a finished polypropylene resin product and the method of preparing such a polypropylene resin is described in U.S. Pat. No. 4,916,198 which is hereby incorporated by reference. Another method to prepare branched/lightly cross-linked polypropylene resin is to introduce chemical compounds into the extruder, along with a polypropylene resin (preferably unbranched and non-lightly cross-linked) and allow the branching/lightly cross-linking reaction to take place in the extruder. U.S. Pat. No. 4,714,716 illustrates this method and is incorporated by reference.

A propylene polymer material or blend of propylene polymer materials is melt processed in a conventional manner by feeding, melting, and metering it in a conventional melt processing apparatus such as an extruder. A volatile blowing agent and an optional crosslinking agent are mixed with the propylene polymer material under pressure to form a flowable gel or admixture. The crosslinking agent, if added, is added in an amount which is sufficient to initiate crosslinking and raise the pressure of the gel or admixture to less than that pressure which causes melt fracture of the polymer to occur. "melt fracture" is a term used in the art to describe a melt flow instability of a polymer as it is extruded through a die which flow instability causes voids and/or other irregularities in the final product.

Suitable branching/crosslinking agents for use in extrusion reactions have been found to include azido and vinyl functional silanes, organic peroxides and multifunctional vinyl monomers.

It is also possible to add various additives such as inorganic fillers, pigments, antioxidants, ultraviolet absorbers, flame retardants, processing aids and the like.

One additive which is not necessary but is generally desirable in some circumstances, is a nucleating agent as is generally known in the art.

As a nucleating agent optionally used in this invention for controlling dispersion and size of cells, there can be referred to inorganic substances such as calcium carbonate, talc, clay, titanium oxide, silica, barium sulfate, diatomaceous earth and the like; carbon dioxide generater by the combination of a bicarbonate or a carbonate of sodium, potassium, ammonium or the like and an inorganic or organic acid such as boric acid, citric acid, tartaric acid or the like; thermal decomposition type chemical foaming agents such as azodicarbonamide, benzenesulfonyl hydrazide, toluenesulfonyl hydrazide and the like; and so on. Among them, finely pulverized products of inorganic substances such as calcium carbonate, talc and the like are relatively preferable in that they have no restriction as to extrusion temperature.

The amount of said nucleating agent may be appropriately selected from the range of 0.01–5 parts by weight per 100 parts by weight of polypropylene resin. In this range, the most preferable amount is 0.1–3 parts by weight. In general, an increased amount of nucleating agent gives a smaller diameter of cell. However, if the amount exceeds 5 parts by weight, agglomeration or insufficient dispersion of nucleating substance occurs, so that the diameter of the cell becomes greater. On the contrary if the amount is less than 0.01 part by weight, the nucleating action is too feeble to decrease the diameter of the cells.

The volatile foaming agents usable in this invention generally have a boiling point temperature range of –50° C.

to +50° C. and include, but are not limited to aliphatic hydrocarbons such as n-pentane, isopentane, neo-pentane, isobutane, n-butane, propane and the like; fluoro-chlorinated hydrocarbons such as dichlorotetrafluoroethane, trichlorotrifluoroethane, trichloromonofluoromethane, dichlorodifluoromethane, dichloromonofluoromethane and the like; and so on. Among them, the non-fully halogenated hydrocarbons are preferable in point of environmental considerations. Particularly preferred among the non-fully halogenated hydrocarbons are partially or fully fluorinated hydrocarbons and non-fully halogenated fluoro-chlorinated hydrocarbons. Examples of these include 1-chloro-1,1-fluoroethane and 1,1-difluoroethane. Particularly preferred among the aliphatic hydrocarbons is isobutane and isobutane/n-butane mixtures. Also contemplated are combinations of these blowing agents with minor amounts of $CO_2$, $H_2O$, $N_2$ and argon in the mixtures. Also decomposable blowing agents, such as azobisformamide, may be incorporated with the volatile foaming agents. Mixtures of any or all of these volatile foaming agents are also contemplated within the scope of this invention.

From the viewpoint of foaming workability and quality of foamed product, the amount of foaming agent added to the polypropylene resin is preferably in the range of 0.05–0.5 pound/moles by weight per 100 pounds by weight of polypropylene resin. Typically, the amount of foaming agent incorporated into the polypropylene resin depends on the desired foam density. In general, incorporation of a greater amount of foaming agent results in a higher expansion ratio (the term "expansion ratio" herein referred to means the ratio (density of resin)/(density of expanded product)) and thus a lower foam density. However care must be taken not to incorporate an amount of foaming agent that causes a separation between resin and foaming agent in the extruder. When this happens, "foaming in the die" occurs, the surface of the expanded product becomes rough and no good expanded product is obtainable.

The foam preferably has a minimal cross-sectional area of at least 5 square inches and a minimal thickness dimension of at least 12.7 millimeters.

The polypropylene foam of the present invention is a closed-cell foam, which means that for the purpose of the present invention about eighty percent or greater of the cells are closed. Closed-sell content is measured in any conventionally known manner.

Surprisingly it has been found that a combination of polypropylene resin properties and final polypropylene foam product properties are required to produce the closed cell polypropylene foam of the present invention.

The foamability factor is the combination of these properties. This factor is expressed by the following equation:

$$F = \rho f * D * (\tan \delta)^{0.75} \leq 1.8 \qquad \text{(Equation 1)}$$

where

F is the foamability factor $\rho f$ is the density of the foam in pounds per cubic foot;

D is the average cell size diameter in millimeters;

tan δ is g"/g'; where g" is the loss modulus; and g' is the storage modulus of the polymer melt using 2.5 mm thick and 25 mm diameter specimans at 190° C. (centigrade) at one Radian per second oscillating frequency.

The foamability factor must be less than or equal to 1.8 for the foam to have at least eighty percent closed-cells. Preferably the foamability factor is less than or equal to 1.5.

The parameter tan δ may be determined by using a mechanical spectrometer, such as model RMS-800, available from Rheometrics, Inc. in Piscataway, N.J. USA.

In the evaluation of rheological characteristics, such as tan δ, g' and g", of visoelastic materials, such as polymer melts, a disk-like specimen, measuring 2.5 mm in thickness and 25 mm in diameter is placed between opposed, axially spaced apart, radially-extending surfaces and is coupled to each surface, filling the axial spacing between the surfaces. One of the surfaces then is rotated about the axial direction relative to the other to place the test specimen in shear and the torque resulting from the shear is measured. The shear may be steady shear, in which case the measured torque is constant, or the shear may be dynamic shear, in which case the measured torque changes continuously with time. The measured torque is proportional to the viscous, or loss component of the modulus (g") of the material. For the purpose of this invention the shear is steady shear, meaning the measured torque, and thus g", is constant at the given temperature. As a result of the nature of the forces applied to the test specimen in this procedure, the test specimen has a tendency to expand axially, thereby placing axially directed forces upon the relatively rotating surfaces to which the specimen is coupled. This axial force exerted upon the surfaces by the test specimen under shear conditions is proportional to the elastic, or storage component of the modulus (g') of the material. The parameter tan δ for the present invention is then calculated as g" divided by g' at the stated temperature and oscillating frequency.

In addition to meeting the requirements of Equation 1, the mixture of the blowing agent and polypropylene polymer material (foaming gel) must be cooled down to the optimum foaming temperature, which is easily determined experimentally. That is, the foam meeting the requirement as described by Equation 1 does not necessarily end up with a closed cell foam if the foaming gel is not optimally cooled. In other words, Equation 1 is a necessary but not a sufficient condition to produce a closed-cell polypropylene foam.

Dimensional stability is also an important factor for closed-cell foams. In the most desirable case the foam would not shrink at all or if it did would recover its original volume in a period of minutes or hours. Thus 'foam dimensional stability' (hereafter called DS) is an important criterion for formulation acceptability.

For the purpose of this specification a foam has satisfactory DS as long as its dimensions recover substantially to the values listed here.

Dimensionally stable foam—a foam that shrinks no more than about 50% and recovers to over 75% of the initial within a week and to over 85% of the initial within about six months, Preferably—the foam shrinks no more than 35% and recovers to over 85% within a week Most preferably—the foam shrinks no more than 20% and recovers to over 90% within a week.

These percentage volume numbers are based on a base foam volume of the foam measured within three minutes of exit from the die.

Another condition that is preferable, but not required is that there be forming plates, consisting of two flat surfaces which are lubricated or covered with a material, such a polytetrafluoroethylene, to reduce friction and prevent sticking, after the die to constrain the foam exiting from the die. The use of such forming plates increases the foam cross-section and cell size and produces a foam product has an unfolded and smooth surface appearance. Surprisingly while the forming plates worked well for the closed-cell polypropylene polymer material foam, the forming plates caused a ragged surface and an increase in density when used to make a low density polyethylene foam.

The following Examples illustrate the present invention.

EXAMPLES

Example I

The equipment use in this example is a 1" screw type extruder having additional zones of mixing and cooling at the end of usual sequential zones of feeding, metering, and mixing. An opening for blowing agent is provided on the extruder barrel between the metering and mixing zones. At the end of the cooling line, there is attached a die orifice having an opening of rectangular shape. The height of the opening, hereinafter called die gap, is adjustable while its width is fixed at 0.145" ("–inch)(3.68 mm (millimeter)).

Granular polypropylene resin was selected from the group presented in Table Ia.

| Resin Designation | Resin Type (1) | Resin Class. (2) | M.F.R. (dg/min) (3) | tan δ (4) | Remarks (5) |
|---|---|---|---|---|---|
| A | H | C | 0.2 | 1.22 | Profax 6823 |
| B | H | HMS | 0.25 | 0.71 | Escorene PD-5291 |
| C | BC | C | 0.4 | 1.63 | Profax 7823 |
| D | RC | C | 0.5 | 1.31 | Developmental |
| E | H | HMS | 0.5 | 0.84 | Developmental |
| F | H | HMS | 0.65 | 1.09 | Developmental |
| G | RC | HMS | 0.8 | 1.17 | Developmental |
| H | RC | C | 1.5 | 1.51 | 7235 by Fina |
| I | RC | C | 2 | 1.69 | 7300 MF by Quantum |
| J | RC | C | 3 | 1.83 | 7300 KF by Quantum |
| K | RC | C | 5 | 2.04 | 3303 Gk by Quantum |
| L | RC | HMS | 6.7 | 1.88 | Developmental |
| M | RC | C | 7 | 2.64 | Dypro W-756 |
| N | RC | HMS | 8 | 1.46 | Developmental |

Notes:
(1) H = homopolymer, BC = block copolymer of 5–10% ethylene and 90–95% propylene, RC = random copolymer of 2–4% ethylene and 96–98% propylene
(2) C = conventional resins, HMS = high melt strength resins
(3) Melt flow rate determine per ASTM D 1238 Condition L
(4) tan δ = loss modulus/storage modulus determined on a model RMS-800 mechanical spectrometer by Rheometric, Inc. with having 2.5 mm thickness and 25 mm diameter specimens on parallel plates at 190° C. at one Radian per second oscillating frequency (5) Profax = Trademark of Himont U.S.A., Inc.
Escorene = Trademark of Exxon Chemical Americas
Fina = Final Oil & Chemical Co.
Quantum = Quantum Chemical Corp.
Dypro = Trademark of Arco Chemical Co.
Developmental = developmental resins made by Himont U.S.A., Inc.

The granular polypropylene resin was fed into the extruder at a uniform rate of approximately 4 pounds per hour. The temperature maintained in the extruder zones were 130° C. (centigrade) at feeding zone, 190° C. at melting zone, 210° C. at metering zone and 220° C. at the mixing zone. A predetermined blowing agent mixture consisting of HCFC-142b (1-chloro-1,1-difluoroethane) and EtCl (ethyl chloride) was prepared in a weigh tank and injected under pressure into the mixing zone at a predetermined uniform rate which ranged from 0.16 lb-moles (pound-moles) of blowing agent mixture per one hundred lbs (pounds) of polymer (abbreviated mph hereinafter) to 0.28 mph. For each polymer, the foaming test was started with a high level of blowing agent and the level was reduced down to the lower levels of blowing agent. For some tests, a small amount of talcum powder was mixed in the polymer for cell size control. The temperature of the cooling zone was maintained so that the polymer/blowing agent mixture could reach an optimum foaming temperature. The foaming temperature varied widely among the polymers and ranged from 130° C. to 156° C.

Once a best foaming condition was reached for the given formulation, the die gap was adjusted to provide a foam strand free from prefoaming. This foam strand had a smooth skin. At the threshold die gap for prefoaming, foam samples were saved and aged at ambient temperature. Foam density, cell size, open cell content, and foam cross-sectional area were determined with foam specimens aged for at least one month. Tan delta (tan δ) values were determined with the virgin resins on a model RMS-800 mechanical spectrometer (manufacture by Rheometrics, Inc.) during temperature sweep at one Radian per second oscillating frequency. The parallel plates configuration was employed and the test specimens had been molded at 180° C. into disks of 2.5 mm in thickness and 25 mm in diameter.

Table Ib summarizes the results of this Example I.

TABLE 1b

| Test No. | Resin Designation | M.F.I. (1) | tan δ (2) | Blowing Agent Ratio (3) | Blowing Agent Level (4) | Talc Level (5) | Foam Density (pf) (6) | Cell Size (7) | (pf) · D (8) | Open Cell (9) | Cross-sectional Area (10) |
|---|---|---|---|---|---|---|---|---|---|---|---|
| A.1 | A | 0.2 | 1.22 | 60/40 | 0.22 | — | 1.39 | 0.43 | 0.60 | 6 | 0.7 |
| B.1 | B | 0.25 | 0.71 | 60/40 | 0.22 | — | 1.34 | 1.01 | 1.35 | 8 | 1.4 |
| B.2 | | | | 60/40 | 0.22 | 0.03 | 1.35 | 0.62 | 0.84 | 7 | 1.0 |
| B.3 | | | | 60/40 | 0.19 | 0.1 | 1.49 | 0.62 | 0.92 | 9 | 1.1 |
| B.4 | | | | 60/40 | 0.22 | — | 1.35 | 2.03 | 2.74 | 59 | 1.94 |
| B.5 | | | | 60/40 | 0.22 | — | 1.35 | 1.62 | 2.19 | 19 | 1.34 |
| C.1 | C | 0.4 | 1.63 | 60/40 | 0.28 | — | 1.46 | 0.51 | 0.74 | 19 | 0.4 |
| D.1 | D | 0.5 | 1.31 | 60/40 | 0.28 | — | 1.12 | 0.65 | 0.73 | 6 | 0.8 |
| D.2 | | | | 60/40 | 0.22 | — | 1.44 | 0.41 | 0.59 | 6 | 0.9 |
| *D.3 | | | | 60/40 | 0.25 | 0.2 | 1.23 | 1.30 | 1.60 | 65 | 1.5 |
| E.1 | E | 0.5 | 0.84 | 60/40 | 0.22 | — | 1.30 | 0.65 | 0.85 | 6 | 1.0 |
| E.2 | | | | 60/40 | 0.16 | — | 1.60 | 1.08 | 1.73 | 1 | 1.3 |
| E.3 | | | | 60/40 | 0.13 | 0.2 | 1.96 | 0.65 | 1.27 | 7 | 1.1 |

TABLE 1b-continued

| Test No. | Resin Designation | M.F.I. (1) | tan δ (2) | Blowing Agent Ratio (3) | Blowing Agent Level (4) | Talc Level (5) | Foam Density (pf) (6) | Cell Size (7) | (pf)·D (8) | Open Cell (9) | Cross-sectional Area (10) |
|---|---|---|---|---|---|---|---|---|---|---|---|
| *E.4 |   |   |   | 60/40 | 0.13 | — | 1.97 | 1.08 | 2.13 | 67 | 1.5 |
| F.1 | F | 0.8 | 1.09 | 60/40 | 0.22 | — | 1.35 | 0.68 | 0.92 | 0 | 0.7 |
| *F.2 |   |   |   | 60/40 | 0.13 | — | 2.87 | 0.90 | 2.58 | 86 | 1.1 |
| G.1 | G | 0.8 | 1.17 | 60/40 | 0.16 | 0.2 | 1.74 | 0.72 | 1.25 | 18 | 0.9 |
| H.1 | H | 1.5 | 1.51 | 60/40 | 0.19 | 0.5 | 1.63 | 0.31 | 0.51 | 8 | 0.9 |
| H.2 |   |   |   | 60/40 | 0.16 | — | 1.83 | 0.26 | 0.48 | 9 | 0.9 |
| H.3 |   |   |   | 60/40 | 0.16 | 0.25 | 1.77 | 0.32 | 0.57 | 5 | 1.2 |
| *H.4 |   |   |   | 60/40 | 0.16 | — | 2.66 | 0.68 | 1.81 | 87 | 1.0 |
| I.1 | I | 2 | 1.69 | 60/40 | 0.22 | — | 1.32 | 0.81 | 1.07 | 14 | 1.1 |
| I.2 |   |   |   | 60/40 | 0.19 | 0.3 | 1.59 | 0.50 | 0.80 | 7 | 0.8 |
| *I.3 |   |   |   | 60/40 | 0.19 | — | 1.87 | 1.62 | 3.03 | 64 | 1.4 |
| J.1 | J | 3 | 1.83 | 49/51 | 0.27 | — | 1.32 | 0.74 | 0.98 | 1 | 0.8 |
| J.2 |   |   |   | 49/51 | 0.27 | — | 1.29 | 1.01 | 1.30 | 27 | 0.7 |
| K.1 | K | 5 | 2.04 | 60/40 | 0.23 | — | 1.37 | 0.77 | 1.05 | 26 | 0.7 |
| L.1 | L | 6.7 | 1.88 | 60/40 | 0.16 | — | 1.81 | 0.93 | 1.68 | 28 | 0.8 |
| *M.1 | M | 7 | 2.64 | 50/50 | 0.19 | — | 1.24 | 0.81 | 1.00 | 58 | 0.5 |
| N.1 | N | 8 | 1.46 | 60/40 | 0.22 | — | 1.60 | 0.65 | 1.04 | 14 | 0.4 |
| N.2 |   |   |   | 60/40 | 0.16 | — | 2.03 | 0.93 | 1.80 | 23 | 0.5 |

Figure 1:
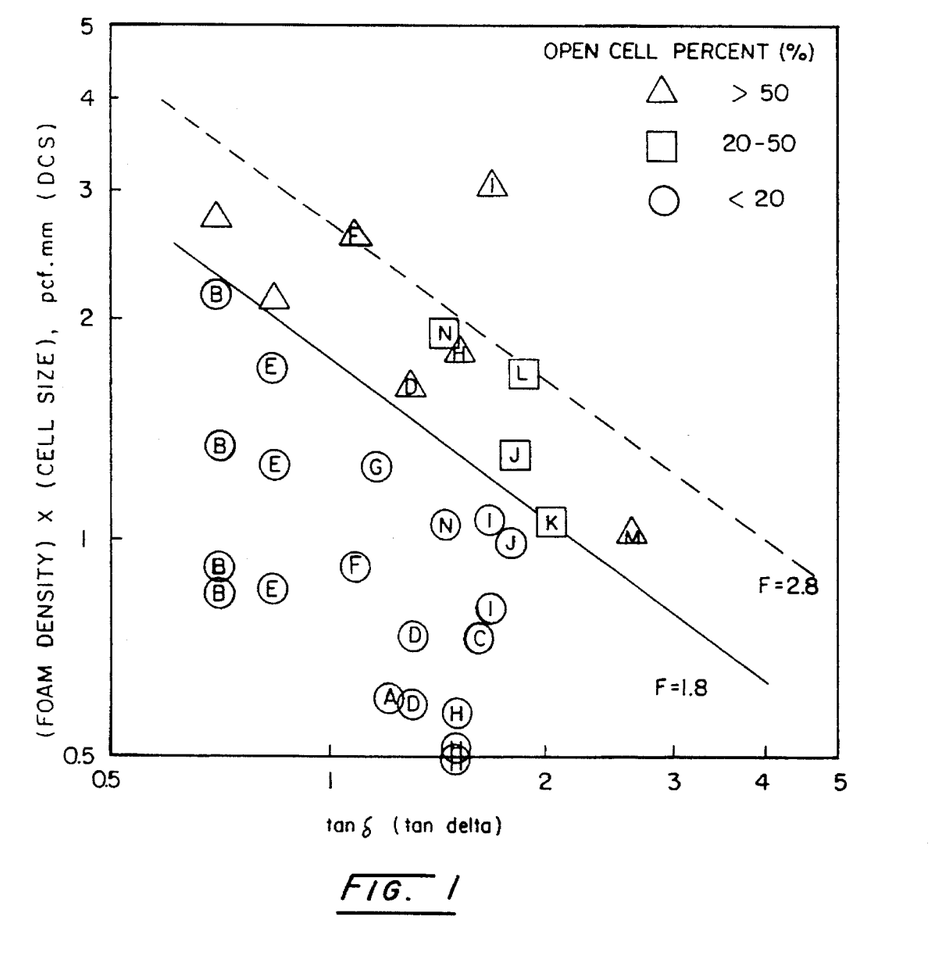
FIG. 1 shows the relationship between foam density, cell size and tan delta for making a closed-cell foam.

NOTES:
*Not an example of this invention
(1) Melt flow index in decigrams per minute determined per ASTM D 1238 at Condition L (230° C., 2.16 Kg)
(2) The ratio of loss modulus to storage modulus of polypropylene melt at 190° C. and one Radian per second frequency determined by using a dynamic mechanical spectrometer manufactured by Rheometries, Inc. (25 mm diameter × 2.2 mm thickness specimens with parallel plates configuration)
(3) Molar ratio of CFC-142b/EtCl
(4) G-moles of blowing agent mixed in per hundred grams of polymer
(5) Parts of talcum powder mixed in per hundred parts of polymer
(6) Foam density in pounds per cubic foot
(7) Average cell size in millimeters determined per ASTM D 3576
(8) Product of foam density and cell size
(9) Open cell content in percentage determined per ASTM D 2856-A
(10) Cross-sectional area of foam body in square centimeters Table Ib and FIG. 1 indicate that a resin having s smaller tan delta is the more readily 'foamable', that is, the more readily produces closed-cell foams. Equation 1 with the A value of 1.8 marks well the condition between the closed-cell (open cell content ▌ 20%) and open-cell foams. Some resins produce partially open-cell foams (where the open cell content is 20–50-%) when the foam product meets equation 1 with the A value between 1.8 and 2.8. When the product of density and cell size is greater than foamability F) of a given resin with the A value of 2.8, a substantially open cell foam (open cell content ▌ 50%) is produced.

The level or amount of blowing agent also affects the production of a closed cell foam. Generally an increased amount of blowing agent produces a foam having more closed cells. A high level of blowing agent also provides a low foam density and makes the cell size smaller. As the level of blowing agent is decreased, the foam density and cell size become larger requiring the addition of a cell nucleator, such as talc. Even with addition of this nucleator, a closed cell foam is difficult to make when the blowing agent level drops below 0.13 mph.

High levels of blowing agent are not always desirable when making a foam product and can produce undesirable characteristics. For example, low density foams made with a high blowing agent level often have small cell sizes and small cross-sectional sizes. In addition, the foam may become corrugated in a transverse direction (as distinguished from the extrusion and vertical directions) because of a rapid expansion rate. Therefore, it is often desirable to use a resin having a small tan delta which allows one to operate at the maximum value of (foam density x cell size) (hereafter called DCS).

Example II

Example I was repeated using only the resin designated I in Table Ia. This resin is made by Quantum Chemical Co. and is a random propylene-ethylene random copolymer with 2–3% ethylene and a melt flow index of 2.0 as determined using the ASTM D-1238 Condition L standard).

The results of this Example II are shown in Table II.

TABLE II

| | Blowing Agents | | | Talc | Foam Density | Cell Size | | | Open Cell | Cross-sectional Area | Dimensional Stability | | |
|---|---|---|---|---|---|---|---|---|---|---|---|---|---|
| Test No. | Type (1) | Ratio (Mole) (2) | Level (mph) (3) | Level (pph) (4) | (pcf) (pf) (5) | (mm) (D) (6) | pf · D (pcf mm) (7) | | (%) (8) | (CM²) (9) | Min. Vol. (%) (10) | 1 Wk (%) (11) | 7 Mo. (%) (12) |
| II.1 | HCFC-142b/EtCl | 100/0 | 0.28 | — | 1.25 | 0.26 | 0.33 | | 7 | 0.27 | 97 | 98 | 96 |
| II.2 | HCFC-142b/EtCl | 100/0 | 0.25 | — | 1.31 | 0.24 | 0.31 | | 4 | 0.45 | 94 | 97 | 95 |
| II.3 | HCFC-142b/EtCl | 100/0 | 0.22 | — | 1.31 | 0.49 | 0.64 | | 3 | 0.63 | 98 | 99 | 98 |
| II.4 | HCFC-142b/EtCl | 100/0 | 0.19 | — | 1.53 | 0.58 | 0.89 | | 32 | 0.92 | 99 | 99 | 99 |
| II.5 | HCFC-142b/EtCl | 90/10 | 0.28 | — | 1.18 | 0.34 | 0.40 | | 10 | 0.53 | 97 | 98 | 97 |
| II.6 | HCFC-142b/EtCl | 90/10 | 0.25 | — | 1.24 | 0.40 | 0.50 | | 7 | 0.62 | 98 | 98 | 97 |
| II.7 | HCFC-142b/EtCl | 90/10 | 0.22 | — | 1.29 | 0.65 | 0.84 | | 1 | 0.88 | 98 | 100 | 100 |
| II.8 | HCFC-142b/EtCl | 90/10 | 0.19 | — | 1.46 | 0.87 | 1.27 | | 55 | 1.17 | 98 | 99 | 99 |
| II.9 | HCFC-142b/EtCl | 80/20 | 0.28 | — | 1.22 | 0.49 | 0.60 | | 5 | 0.87 | 94 | 97 | 96 |
| II.10 | HCFC-142b/EtCl | 80/20 | 0.25 | — | 1.27 | 0.85 | 1.08 | | 18 | 0.83 | 94 | 98 | 99 |
| II.11 | HCFC-142b/EtCl | 80/20 | 0.22 | — | 1.44 | 0.93 | 1.34 | | 68 | 0.99 | 98 | 98 | 98 |
| II.12 | HCFC-142b/EtCl | 70/30 | 0.28 | — | 1.13 | 0.62 | 0.70 | | 2 | 0.73 | 89 | 100 | 99 |
| II.13 | HCFC-142b/EtCl | 70/30 | 0.25 | — | 1.26 | 1.04 | 1.31 | | 45 | 1.07 | 95 | 99 | 99 |
| *II.14 | HCFC-142b/EtCl | 70/30 | 0.22 | — | 1.39 | 1.16 | 1.61 | | 75 | 1.35 | 94 | 102 | 97 |
| II.15 | HCFC-142b/EtCl | 70/30 | 0.22 | 0.2 | 1.35 | 0.44 | 0.59 | | 3 | 0.84 | 88 | 98 | 98 |
| II.16 | HCFC-142b/EtCl | 70/30 | 0.19 | 0.3 | 1.54 | 0.46 | 0.71 | | 2 | 0.65 | 91 | 97 | 98 |
| II.17 | HCFC-142b/EtCl | 60/40 | 0.31 | — | 1.22 | 0.50 | 0.61 | | 7 | 0.47 | 88 | 100 | 99 |
| II.18 | HCFC-142b/EtCl | 60/40 | 0.25 | — | 1.23 | 0.81 | 1.00 | | 19 | 0.92 | 82 | 96 | 98 |
| II.19 | HCFC-142b/EtCl | 60/40 | 0.22 | — | 1.32 | 0.81 | 1.07 | | 14 | 1.06 | 88 | 95 | 96 |
| *II.20 | HCFC-142b/EtCl | 60/40 | 0.19 | — | 1.87 | 1.62 | 3.03 | | 64 | 1.38 | 94 | 94 | 95 |
| II.21 | HCFC-142b/EtCl | 60/40 | 0.19 | 0.3 | 1.59 | 0.50 | 0.80 | | 7 | 0.76 | 87 | 97 | 97 |
| *II.22 | HCFC-142b/EtCl | 60/40 | 0.16 | 0.3 | 1.91 | 0.87 | 1.66 | | 68 | 0.89 | 94 | 95 | 95*** |
| II.23 | HCFC-142b/EtCl | 50/50 | 0.37 | — | 1.02 | 0.54 | 0.55 | | 7 | 0.45 | 79 | 96 | 96 |
| II.24 | HCFC-142b/EtCl | 50/50 | 0.34 | — | 1.07 | 0.56 | 0.60 | | 4 | 0.51 | 77 | 96 | 97 |
| II.25 | HCFC-142b/EtCl | 50/50 | 0.31 | — | 1.09 | 0.62 | 0.68 | | 1 | 0.65 | 74 | 94 | 95 |
| II.26 | HCFC-142b/EtCl | 50/50 | 0.28 | — | 1.19 | 0.91 | 1.08 | | 1 | 0.79 | 71 | 92 | 94 |
| *II.27 | HCFC-142b/EtCl | 50/50 | 0.25 | — | 1.27 | 1.25 | 1.59 | | 68 | 0.94 | 93 | 97 | 98 |
| II.28 | HCFC-142b/EtCl | 50/50 | 0.25 | 0.5 | 1.41 | 0.41 | 0.58 | | 8 | 0.68 | 78 | 95 | 97 |
| II.29 | HCFC-142b/EtCl | 50/50 | 0.22 | 0.5 | 1.48 | 0.43 | 0.64 | | 5 | 0.61 | 76 | 95 | 96 |
| II.30 | HCFC-142b/EtCl | 50/50 | 0.19 | 0.5 | 1.62 | 0.45 | 0.73 | | 13 | 0.63 | 80 | 94 | 95 |
| II.31 | HCFC-142b/EtCl | 50/50 | 0.16 | 0.5 | 2.52 | 0.65 | 1.64 | | 64 | 0.49 | ND | ND | ND |
| II.32 | HCFC-142b/EtCl | 40/60 | 0.37 | — | 1.23 | 0.72 | 0.89 | | 8 | 0.36 | 75 | 97 | 102 |
| II.33 | HCFC-142b/EtCl | 40/60 | 0.34 | — | 1.16 | 0.96 | 1.11 | | 9 | 0.65 | 65 | 89 | 95 |
| *II.34 | HCFC-142b/EtCl | 40/60 | 0.31 | — | 1.13 | 1.25 | 1.41 | | 74 | 0.91 | 100 | 102 | 102 |
| *II.35 | HCFC-142b/EtCl | 40/60 | 0.28 | — | 1.87 | 1.12 | 2.09 | | 82 | 0.69 | 97 | 97 | 97 |
| II.36 | HCFC-142b/EtCl | 40/60 | 0.28 | 0.5 | 1.46 | 0.50 | 0.73 | | 9 | 0.44 | 67 | 88 | 92 |
| II.37 | HCFC-142b/EtCl | 40/60 | 0.25 | 0.5 | 1.51 | 0.46 | 0.69 | | 6 | 0.46 | 65 | 87 | 92 |
| II.38 | HCFC-142b/EtCl | 40/60 | 0.22 | 0.5 | 1.58 | 0.52 | 0.82 | | 20 | 0.52 | 74 | 90 | 93 |
| II.39 | HCFC-142b/EtCl | 30/70 | 0.37 | — | 1.20 | 0.74 | 0.89 | | 16 | 0.52 | 57 | 81 | 87 |
| II.40 | HCFC-142b/EtCl | 30/70 | 0.34 | — | 1.27 | 0.85 | 1.08 | | 7 | 0.60 | 52 | 76 | 83 |
| II.41 | HCFC-142b/EtCl | 30/70 | 0.31 | — | 1.34 | 0.93 | 1.25 | | 15 | 0.72 | 60 | 82 | 90 |
| *II.42 | HCFC-142b/EtCl | 30/70 | 0.28 | — | 1.37 | 1.35 | 1.85 | | 67 | 0.95 | 92 | 99 | 94 |
| II.43 | HCFC-142b/EtCl | 30/70 | 0.28 | 0.3 | 1.48 | 0.43 | 0.64 | | 10 | 0.41 | 56 | 78 | 86 |
| II.44 | HCFC-142b/EtCl | 30/70 | 0.25 | 0.3 | 1.64 | 0.65 | 1.07 | | 10 | 0.56 | 53 | 75 | 82 |
| II.45 | HCFC-142b/EtCl | 30/70 | 0.22 | 0.3 | 1.69 | 0.54 | 0.91 | | 21 | 0.81 | 60 | 80 | 86 |
| *II.46 | HCFC-142b/EtCl | 30/70 | 0.19 | 0.5 | 1.83 | 0.65 | 1.19 | | 63 | 0.77 | 70 | 84 | 86 |
| *II.47 | HCFC-142b/EtCl | 30/70 | 0.16 | 0.5 | 2.64 | 0.81 | 2.14 | | 80 | 0.81 | 92 | 94 | 92 |
| II.48 | HCFC-142b/EtCl | 20/80 | 0.37 | — | 1.54 | 1.01 | 1.56 | | 23 | 0.60 | 38 | 56 | 68 |
| II.49 | HCFC-142b/EtCl | 20/80 | 0.34 | — | 1.37 | 1.20 | 1.64 | | 24 | 0.62 | 41 | 63 | 76 |
| *II.50 | HCFC-142b/EtCl | 20/80 | 0.31 | — | 1.27 | 1.62 | 2.06 | | 68 | 0.91 | 88 | 94 | 94 |
| *II.51 | HCFC-142b/EtCl | 20/80 | 0.28 | — | 1.69 | 1.73 | 2.92 | | 76 | 1.12 | 92 | 92 | 92 |
| II.52 | HCFC-142b/EtCl | 20/80 | 0.28 | 0.3 | 1.70 | 0.54 | 0.92 | | 14 | 0.71 | 44 | 66 | 79 |
| II.53 | HCFC-142b/EtCl | 20/80 | 0.25 | 0.3 | 1.78 | 0.54 | 0.96 | | 18 | 0.52 | 47 | 67 | 80 |
| II.54 | HCFC-142b/EtCl | 20/80 | 0.22 | 0.4 | 1.95 | 0.46 | 0.90 | | 12 | 0.49 | 53 | 74 | 83 |
| *II.55 | HCFC-142b/EtCl | 20/80 | 0.19 | 0.5 | 2.40 | 0.81 | 1.94 | | 78 | 0.72 | 90 | 91 | 91 |

NOTES:
*Not an example of this invention
(1) Type of blowing agent used
(2) Molar ratio
(3) Pound moles of blowing agent mixed in per hundred pounds of polymer
(4) Parts of talcum powder mixed in per hundred parts of polymer
(5) Density of foam body in pounds per cubic foot measured after size months
(6) Cell size in millimeters determined per ASTM D 3576
(7) Product of density and cell size
(8) Open cell content in percentage determined per ASTM D 2856-A
(9) Cross-sectional area of foam body in square centimeters
(10) Minimum volume of foam body experiencing during aging as a percentage of the initial measured within about 30 seconds after extrusion. ND - not determined.

TABLE II-continued

| | Blowing Agents | | | Talc | Foam Density | Cell Size | | Open Cell | Cross-sectional | Dimensional Stability | | |
|---|---|---|---|---|---|---|---|---|---|---|---|---|
| Test No. | Type (1) | Ratio (Mole) (2) | Level (mph) (3) | Level (pph) (4) | (pcf) (pf) (5) | (mm) (D) (6) | pf · D (pcf mm) (7) | (%) (8) | Area (CM²) (9) | Min. Vol. (%) (10) | 1 Wk (%) (11) | 7 Mo. (%) (12) |

(11), (12) Volume of one week and 7 month old foam, respectively, as a percentage of the initial volume measured within about 30 seconds after extrusion As can be seen in Table II, there is a general tendency that the DCS value increases as the EtCl level in the blowing agent mixture increase. The Quantum 7300MF resin used in this example has tan delta value of 1.69 and thus a DCS value of 1.21 and 1.89 for the F (foamability) values of 1.8 and 2.8, respectively. It is noted that DCS=1.21 well divides the open cell and closed cell regions for a resin having a tan delta value of 1.69 (open cell content ▌ 20%). Foams failing between DCS=1.21 and DCS=1.89 are moderately open-celled (20–50% open cell content). Foams having their DCS values greater than 1.89 are substantially open-celled (open cell content ▌ 50%).

Also from the DS definition stated previously in the specification and the data in Table II, it can be seen that a dimensionally stable foam can be made with a HCFC-142b/EtCl mixture having as little as 30% HCFC-142b. Preferably dimensional stability is achieved with an HCFC-142b level 40% or higher. Most preferably dimensional stability is attained when the HCFC-142b level exceeds 50%. Since the foam cross-sectional capability decreases as the level of HCFC-142b is increased, the 60/40 and 70/30 by mole mixture of HCFC-142b/EtCl provide the most balanced dimensional stability and foam cross-sectional size.

Example III

The procedure of Example I was repeated using the same resin designated in Example II.

The results are consolidated in Table IIIa for single and binary blowing agent systems and in Table IIIb for HCFC-142b/EtCl/CO2 ternary blowing agents.

TABLE IIIa

| | Polymer | Blowing Agent | | | Talc | Foam Density | Cell Size | | Open Cell | Cross-sectional | Dimensional Stability | |
|---|---|---|---|---|---|---|---|---|---|---|---|---|
| Test No. | Rate (lb/hr) (12) | Type (1) | Ratio (Mole) (2) | Level (mph) (3) | Level (pph) (4) | (pcf) (pf) (5) | (mm) (D) (6) | pf · D (pcf mm) (7) | (%) (8) | Area (CM²) (9) | Min. Vol. (%) (10) | 1 Wk (%) (11) |
| III.1 | 3.5 | CFC-114 | — | 0.28 | — | 1.33 | 0.10 | 0.13 | 6 | 0.21 | 92 | 93 |
| III.2 | 3.5 | CFC-114/EtCl | 50/50 | 0.28 | — | 1.37 | 0.70 | 0.96 | 13 | 0.79 | 95 | 95 |
| III.3 | 4 | CFC-114/EtCl | 30/70 | 0.28 | — | 1.25 | 0.85 | 1.06 | 49 | 1.31 | 97 | 99 |
| III.4 | 4 | CFC-114/EtCl | 30/70 | 0.28 | 0.3 | 1.36 | 0.34 | 0.46 | 5 | 0.50 | 70 | 110 |
| *III.5 | 4 | CFC-114/EtCl | 20/80 | 0.28 | — | 1.82 | 2.31 | 4.20 | 79 | 1.66 | 92 | 98 |
| III.6 | 4.0 | CFC-114/EtCl | 20/80 | 0.28 | 0.2 | 1.45 | 0.68 | 0.99 | 3 | 0.99 | 53 | 96 |
| *III.7 | 3.5 | EtCl | — | 0.28 | 0.5 | 1.39 | 0.72 | 1.00 | 33 | 0.60 | 28 | 47 |
| III.8 | 4 | CFC-12 | — | 0.28 | — | 1.23 | 0.48 | 0.59 | 7 | 0.68 | 71 | 85 |
| III.9 | 4 | CFC-12/EtCl | 50/50 | 0.28 | — | 1.43 | 0.81 | 1.16 | 1 | 1.23 | 61 | 80 |
| *III.10 | 4 | CFC-12/EtCl | 50/50 | 0.14 | — | 2.03 | 0.95 | 1.93 | 75 | 1.37 | ND | ND |
| *III.11 | 4 | CFC-12/EtCl | 20/80 | 0.28 | — | 2.05 | 1.80 | 3.69 | 72 | 1.27 | 80 | 90 |
| *III.12 | 4 | CFC-12/EtCl | 20/80 | 0.28 | 0.3 | 1.58 | 0.68 | 1.07 | 14 | 0.72 | 43 | 64 |
| III.13 | 4 | HCFC-142b/MeCl | 80/20 | 0.28 | — | 1.07 | 0.75 | 0.80 | 0 | 0.83 | 86 | 97 |
| III.14 | 4 | HCFC-142b/MeCl | 50/50 | 0.28 | 0.3 | 1.30 | 0.54 | 0.7 | 2 | 0.63 | 75 | 90 |
| *III.15 | 4 | HCFC-142b/MeCl | 30/70 | 0.28 | — | 1.37 | 1.08 | 1.48 | 62 | 1.13 | 91 | 96 |
| III.16 | 4 | HCFC-142b/MeCl$_2$ | 80/20 | 0.28 | — | 1.13 | 0.54 | 0.61 | 2 | 0.67 | 92 | 98 |
| *III.17 | 4 | HCFC-142b/MeCl$_2$ | 50/50 | 0.28 | — | 1.49 | 1.47 | 2.19 | 82 | 0.64 | 99 | 87 |
| III.18 | 4 | CFC-12/CFC-11 | 50/50 | 0.28 | 0.3 | 1.36 | 0.51 | 0.69 | 3 | 0.76 | 62 | 78 |

Notes:
*Not an example of this invention
(1) through (11) = the same as in Table II
(12) Rate of polymer extruded in pounds per hour
CFC-114 = 1,2-dichloro-1,1,2,2-tetrafluoroethane
CFC-12 = dichlorodifluoromethane
MeCl = methyl chloride
MeCl$_2$ = methylene chloride
CFC-11 = trichlorofluoromethane
CO$_2$ = carbon dioxide TABLE IIIb

| Test No. | HCFC-142b/EtCl/CO$_2$ Ratio (2) | Level (mph) (3) | Talc Level (pph) (4) | Foam Density (pcf) (pf) (5) | Cell Size (mm) (D) (6) | pf · D (pcf mm) (7) | Open Cell (%) (8) | Cross-sectional Area (CM$^2$) (9) | Dimensional Stability Min. Vol. (%) (10) | 1 Wk (%) (11) |
|---|---|---|---|---|---|---|---|---|---|---|
| III.19 | 60/30/10 | 0.37 | — | 1.19 | 0.27 | 0.32 | 5 | 0.39 | 88 | 95 |
| III.20 | 60/30/10 | 0.34 | — | 1.07 | 0.50 | 0.54 | 3 | 0.52 | 83 | 94 |
| III.21 | 60/30/10 | 0.31 | — | 1.07 | 1.65 | 1.70 | 1 | 0.63 | 83 | 96 |
| III.22 | 60/30/10 | 0.28 | — | 1.11 | 1.72 | 0.80 | 1 | 0.67 | 83 | 95 |
| *III.23 | 60/30/10 | 0.25 | — | 1.37 | 1.62 | 2.22 | 58 | 0.86 | 96 | 98 |
| III.24 | 60/30/10 | 0.25 | 0.3 | 1.38 | 0.30 | 0.41 | 5 | 0.51 | 85 | 96 |
| III.25 | 60/30/10 | 0.22 | 0.3 | 1.41 | 0.49 | 0.69 | 3 | 0.62 | 89 | 95 |
| III.26 | 60/30/10 | 0.19 | 0.3 | 1.67 | 0.30 | 0.50 | 4 | 0.61 | 84 | 94 |
| *III.27 | 60/30/10 | 0.16 | 0.3 | 1.96 | 0.59 | 1.16 | 56 | 0.76 | 98 | 98 |
| III.28 | 60/20/20 | 0.37 | — | 1.27 | 0.27 | 0.34 | 8 | 0.32 | 93 | 92 |
| III.29 | 60/20/20 | 0.34 | — | 1.28 | 0.21 | 0.27 | 6 | 0.28 | 93 | 94 |
| III.30 | 60/20/20 | 0.31 | — | 1.40 | 1.26 | 1.36 | 2 | 0.36 | 88 | 94 |
| III.31 | 60/20/20 | 0.28 | — | 1.29 | 1.32 | 0.41 | 5 | 0.40 | 85 | 94 |
| III.32 | 60/20/20 | 0.25 | — | 1.19 | 1.76 | 0.90 | 21 | 0.77 | 89 | 97 |
| III.33 | 60/20/20 | 0.25 | 0.3 | 1.44 | 0.25 | 0.36 | 6 | 0.33 | 89 | 96 |
| III.34 | 60/20/20 | 0.22 | 0.3 | 1.55 | 0.32 | 0.50 | 5 | 0.34 | 90 | 97 |
| III.35 | 60/20/20 | 0.19 | 0.3 | 1.62 | 0.31 | 0.50 | 5 | 0.52 | 87 | 95 |
| III.36 | 60/20/20 | 0.16 | 0.3 | 1.93 | 0.41 | 1.79 | 7 | 0.57 | 91 | 96 |

Notes:
*Not an example of this invention
(2) through (11) = the same as in Table II The data for foams expanded with a wide variety of blowing agents support the applicability of Equation 1 as a criteria. Note the DCS values for resin I (as listed in Table Ia) feedstock (Quantum 7300MF) are 1.21 and 1.89 for the F (foamability) values of 1.8 and 2.8, respectively. Closed cell foams expanded with EtCl or CFC/EtCl mixtures having more that 70% EtCl show unsatisfactory dimensional stability. Single CFC blowing agents, CFC-114 and CFC-12, expand dimensionally stable foams but the cross-sectional sizes of the foams are small. Although the foam's cross-sectional capability suffers from the incorporation of CO2 as a blowing agent component, the HCFC-142b/EtCl/CO2 ternary blowing agent mixture provides substantially closed cell foams having satisfactory dimensional stability (Table IIIb).

Optimal foaming temperatures for the CFC-114/EtCl blowing agent mixture ranged from 125° C. to 131° C. for this specific resin. Optimal foaming temperatures for the CFC-12/EtCl blowing agent mixture ranged from 127° C. to 133° C. for this specific resin. Optimal foaming temperatures for the HCFC-142b/MeCl blowing agent mixture ranged from 130° C. to 133° C. for this specific resin. An optimal foaming temperatures for the CFC-12b/CFC-11 blowing agent mixture is 130° C. for this specific resin. Optimal foaming temperatures for the HCFC-]42b/EtCl/CO$_2$ blowing agent mixture ranged from 130° C. to 133° C. for this specific resin.

Example IV

The apparatus used in this example is a one inch foam extrusion line as employed in Examples I through III. In the tests of this example, a high melt strength polypropylene homopolymer (resin F in Table Ia) was expanded with several new blowing agent systems as listed in Table IV.

TABLE IV

| Test No. | Blowing Agent Type (1) | Blowing Agent Ratio (Mole) (2) | Blowing Agent Level (mph) (3) | Talc Level (pph) (4) | Foam Density (pcf) (pf) (5) | Cell Size (mm) (D) (6) | pf · D (pcf mm) (7) | Open Cell (%) (8) | Cross-sectional Area (CM$^2$) (9) | Dimensional Stability Min. Vol. (%) (10) | 2 Wk (%) (11) |
|---|---|---|---|---|---|---|---|---|---|---|---|
| IV.1 | HCFC-142b/n-butane | 80/20 | 0.22 | — | 1.30 | 0.60 | 0.78 | 11 | 0.54 | 100 | 100 |
| IV.2 | HCFC-142b/n-butane | 60/40 | 0.22 | — | 1.39 | 0.48 | 0.67 | 28 | 0.46 | 98 | 99 |
| IV.3 | HCFC-142b/n-butane | 20/80 | 0.22 | — | 1.44 | 0.54 | 0.78 | 11 | 0.54 | 83 | 96 |
| IV.4 | HCFC-142b/n-butane | 60/40 | 0.22 | 0.02 | 1.17 | 0.77 | 0.90 | 49 | 0.91 | 102 | 105 |
| IV.5 | HCFC-142b/n-butane | 60/40 | 0.22 | 0.03 | 1.52 | 0.60 | 0.91 | 42 | 0.43 | 40 | 76 |
| IV.6 | isobutane | — | 0.22 | — | 1.22 | 0.68 | 0.83 | 10 | 0.87 | 100 | 103 |
| IV.7 | isobutane | 60/40 | 0.22 | — | 1.21 | 0.60 | 0.73 | 12 | 0.69 | 98 | 103 |
| IV.8 | isobutane/HCFC-141b | 60/40 | 0.22 | — | 1.39 | 0.44 | 0.61 | 10 | 0.72 | 99 | 100 |
| IV.9 | isobutane/HCFC-141b | 60/40 | 0.22 | — | 1.41 | 0.48 | 0.68 | 8 | 1.01 | 96 | 102 |
| IV.10 | isobutane/EtCl | 60/40 | 0.22 | — | 1.31 | 0.52 | 0.68 | 9 | 0.80 | 94 | 102 |
| IV.11 | HCFC-124 | — | 0.22 | — | 1.47 | 0.10 | 0.15 | 25 | 0.29 | 97 | 98 |
| IV.12 | HCFC-124/EtCL | 60/40 | 0.22 | — | 1.34 | 0.45 | 0.60 | 2 | 0.57 | 96 | 102 |
| IV.13 | HCFC-124/isobutane | 60/40 | 0.22 | — | 1.38 | 0.37 | 0.51 | 11 | 0.44 | 96 | 100 |
| IV.14 | HCFC-124/n-butane | 60/40 | 0.22 | — | 1.41 | 0.54 | 0.76 | 12 | 0.80 | 98 | 101 |
| IV.15 | HCFC-124/HCFC-123 | 60/40 | 0.22 | — | 1.25 | 0.32 | 0.40 | 17 | 0.30 | 99 | 100 |
| IV.16 | HCFC-123 | — | 0.22 | — | 1.32 | 0.60 | 0.79 | 33 | 0.70 | 45 | 81 |
| IV.17 | n-butane | — | 0.22 | — | 1.38 | 0.74 | 1.02 | 17 | 0.70 | 73 | 96 |
| *IV.18 | HCFC-141b | — | 0.22 | 0.08 | 1.39 | 1.35 | 1.88 | 86 | 1.29 | 99 | 99 |
| IV.19 | FC-134a | — | 0.22 | GMS 0.5 | 1.89 | 0.11 | 0.21 | 29 | 0.24 | ND | ND |
| IV.20 | FC-134a | — | 0.13 | GMS 0.5 | 2.12 | 0.11 | 0.23 | 23 | 0.30 | 99 | 99 |
| IV.21 | FC-134a/n-butane | 60/40 | 0.16 | GMS 0.5 | 2.04 | 0.12 | 0.24 | 30 | 0.27 | 98 | 100 |
| IV.22 | FC-134a/EtCl | 60/40 | 0.16 | GMS 0.5 | 1.84 | 0.28 | 0.52 | 7 | 0.49 | 100 | 102 |
| IV.23 | FC-134a/HCFC-123 | 60/40 | 0.16 | GMS 0.5 | 1.84 | 0.18 | 0.33 | 16 | 0.25 | 98 | 96 |
| IV.24 | FC 152a | — | 0.16 | — | 1.66 | 0.62 | 0.97 | 28 | 0.66 | 100 | 100 |
| IV.25 | FC-152a/n-butane | 60/40 | 0.16 | — | 1.36 | 0.68 | 0.92 | 5 | 0.58 | 100 | 101 |
| IV.26 | FC-152a/EtCl | 60/40 | 0.16 | — | 1.42 | 0.51 | 0.72 | 17 | 0.57 | 92 | 101 |
| IV.27 | FC-152a/HCFC-123 | 60/40 | 0.16 | — | 1.17 | 0.62 | 0.73 | 13 | 0.53 | 95 | 101 |

Notes: *Not an example of this invention
(1) through (10) = the same as in Table II
(11) Volume of 2 week old foam as a percentage of the initial volume measured within about 30 seconds after extrusion
HCFC-142b = 1-chloro-1,1-difluoroethane
HCFC-141b = 1,1-dichloro-1-fluoroethane
HCFC-123 = 1,1-dichloro-2,2,2-trifluoroethane
HCFC-124 = 1-chloro-1,2,2,2-tetrafluoroethane
HFC-134a = 1,1,1,2-tetrafluoroethane
HFC-152a = 1,1-difluoroethane All blowing agents evaluated in this example produce a foam having a low density, with the greatest density being only 2.12 pcf. For the foams made with this resin, having a tan delta value of 1.09, the DCS value of 1.69 is well applicable with the F (foamability) value of 1.8. Except for HCFC-123 (and probably HCFC-141b if a closed cell foam is made with this blowing agent), all the other blowing agents make dimensionally stable foam. The dimensional stability of the polypropylene foams achieved by the hydrocarbon blowing agents and blowing agent mixtures is surprising and remarkable. Typically isobutane requires a permeability modifier to make a dimensionally stable polyethylene foam while n-butane fail to produce dimensionally stable polyethylene foams even when a permeability modifier is incorporated.

Among single blowing agents, isobutane performs well as indicated by a relatively large cross-sectional size and excellent dimensional stability. HCFC-124 and HCF-134a are marginal as single blowing agents producing foams having very small cell sizes and cross-sections. A small amount of glycerol monostearate (GMS) was added to HFC-134a blowing agent systems in order to enlarge the cell size. The performance of HFC-152a is adequate. Sometimes, as seen in Table IV, mixing in a high solubility secondary blowing agent improves foam performance (cell size, cross-sectional size, open cell content) of these HCFC and HFC blowing agents.

Example V

In this example, an accumulation extrusion process is beneficially used to produce a large cross-sectional polypropylene foam having a low density and small cell sizes. In this method an accumulating system is inserted after the extruder and before the die. The accumulating system can be any accumulating vessel, but in this Example it is a pressure chamber of one liter with a regulated nitrogen pressure source. The foamable gell is accumulated in the chamber and pushed out by nitrogen pressure. The extruder is a 1½" screw type having additional zones for mixing and cooling at the end of the usual sequential zones of feeding, metering and mixing. An opening for the blowing agent is provided on the extruder barrel between the metering and mixing zones. At the end of the cooling zone there is an attached die orifice having an opening of rectangular shape. The height, or die gap, of the opening ia adjustable. The width is fixed at 0.25" (6.35 mm).

Resin I in Table Ia is fed into the extruder at a uniform rate of about 9.3 pounds per hour. The blowing agent mixture injected into the mixing zone is HCFC-142b/EtCl in the percentages and amounts listed in the Table V. The temperature maintained in the extruder zones were 120° C. (centigrade) at feeding zone, 190° C. at melting zone, 190° C. at metering zone and 160° C. at the mixing zone. The accumulator and transfer line are maintained at about 138° C.

The foamable was accumulated and shot out through the die orifice by nitrogen pressure. The results of this Example are in Table V.

TABLE V

| Test No. | Blowing Agent Ratio Mole (2) | Blowing Agent Level (mph) (3) | Talc Level (pph) (4) | Foam Density (pcf) (pf) (5) | Cell Size (mm) (D) (6) | pf · D (pcf mm) (7) | Open Cell (%) (8) | Dimensional Stability 1 Wk (%) (10) | Dimensional Stability 2 Wk (%) (11) | Dimensional Stability 8 Month (%) (11) |
|---|---|---|---|---|---|---|---|---|---|---|
| *V.1 | 60/40 | 0.28 | — | 1.04 | 1.41 | 1.47 | 25 | ND** | ND | ND |
| V.2 | 60/40 | 0.28 | — | 1.21 | 1.13 | 1.37 | 4 | 75 | 93 | 98 |
| V.3 | 60/40 | 0.28 | 0.2 | 1.08 | 0.77 | 0.83 | 2 | 73 | 88 | 96 |
| V.4 | 72/28 | 0.28 | 0.2 | 1.40 | 0.54 | 0.76 | 4 | 87 | 103 | 103 |

Notes:
*Not an example of the present invention
**Not determine
(2) through (8) = the same as in Table II
(10), (11) & (12) Volumes at 1 week, 2 weeks and 8 months as a percentage of the initial volume measured within about 30 seconds after extrusion As can be seen in Table V the foams are substantially closed-cell and within dimensional stability limits (with the exception of V.1). All four examples provided good quality foams with large cross-sections, including some up to 5.9 square inches. As can also be seen in Table V dimensional stability is acceptable.

The accumulating extrusion is one of two preferred processed methods for producing the polypropylene foam products according to this invention. The other is the coalesced strand foam method. This high extrusion rate accomplished through the use of an accumulating extrusion system (AES) permits production of fold-free foam products having large cross-sections.

Example VI

This example illustrates that the technology is scalable to a large foam extrusion line. The apparatus used in the example is a 3-½" screw type extruder having essentially the same configuration as the one employed in Example I except for the die. The apparatus is equipped with a multi-hole die having 722 holes of 0.041" diameter arranged in 38 rows and 19 columns in a equilateral triangular pattern with 0.125" distance between holes. The operating procedure of this apparatus is essentially the same as one used in Example I.

In practice, a polypropylene homopolymer (Resin F in Table Ia) was fed into the extruder at a uniform rate of approximately 200 lbs/hr. The temperatures maintained at the extruded zones were 130° C. at feeding zone, 20C° C. at melting zone, 230° C. at metering zone and 230° C. at mixing zone. An 80/20 by weight (72/28 by mole) mixture of HCFC-142b/EtCl was prepared in a weigh tank and injected under pressure into the mixing zone at a rate of 34 lbs/hr which amounted to 17 parts per hundred parts of polymer of 0.188 mph. When the uniform mixture of the polymer/blowing agent mixture was cooled down to approximately 155° C. a good foam having fine cell size was achieved. The foam strands coalesced together leaving little noticeable interstices among them and resulted in a foam plank of 2.5"×4.5" cross-section. The foam has 1.27 pcf density, 0.87 mm cell and approximately 13% open cells. The foam had a thermal conductivity of 0.28 B.t.u./(hr)(ft$^2$)(F/in) which compares favorably with that of an extruded polyethylene foam plank is typically 0.45 B.t.u./(hr)(ft$^2$)(F/in). With its resiliency and low thermal conductivity, the polypropylene foam product is not only useful for cushion packaging but also for insulation applications.

Example VII

This example shows that an extruded polypropylene foam prepared according to the present invention may be thermoformed to useful articles. The foaming apparatus used in this example is the same as used Example VII except that a gap-adjustable slit die of 1.5" (38.1 mm) width was installed on the apparatus instead of a multi-hole die.

The same polypropylene homopolymer resin as used in Example VII was fed into the extruder at a uniform rate of approximately 200 lbs/hr. The extruder zones were set at the same temperatures as in Example VII. A 70/30 by weigh (60/40 by mole) mixture of HCFC-142b/EtCl was prepared in a weigh tank and injected under pressure into the mixing zone at a rate of 34 lbs/hr which amounted to 17 parts per hundred parts of polymer of 0.20 mph. When the polymer/blowing agent mixture was uniformly cooled down to an optimum foaming temperature of 155° C., the die gap was adjusted to prepare a foam free from prefoaming. At a die gap of 0.049" (1.24 mm), a substantially closed cell (open cell content=3.5%) polypropylene foam having 1.21 pcf density end 0.55 mm cell size was obtained. The foam had a thickness of 0.79" and a width of 3.56" developed some corrugation. Such corrugation is remedied by increasing the extrusion rate.

The demonstration mold for thermoforming purposes was made from a stainless steel beaker having 3-⅜" diameter. The beaker was perforated on all sides and had a perforated top closure fit inside the beaker. A ¾; oak cube is adhered at the bottom center of the beaker. Foam disks of 3-¼" diameter were cut out of the foam plank, put in the mold, heated in a convection oven for 3 minutes at 180° C., taken out and pressed by the top closure. Good moldings well reflecting the mold geometry were achieved.

While embodiments of the method and the foam of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. An extruded, closed-cell propylene polymer plank foam, comprising:

(a) a propylene polymer resin, having melt flow index less than about 10 decigrams/minute at 230 degrees centigrade; and (b) the foam having a foamalbility characteristic (F) of less than or equal to about 1.8, the foam having a minimal cross-sectional area of at least about 5 square inches, the foam having a minimal thickness dimension of at least 12.7 millimeters, the foam having a density of less than about 5 pounds per cubic foot, the foam having greater than 80 percent closed cells.

2. The foam of claim 1, wherein the propylene polymer resin has melt flow index of less than about 4 decigrams/minute at 230 degrees cenigrade.

3. The foam product of claim 1, wherein the foamed product has a foamability characteristic (F) of less than or equal to about 1.5.

4. The foam product of claim 1, wherein the foamed product has a density of less than about 2.5 pounds per cubic foot.

5. The foam of claim 1, wherein the foamed product has a cell size of less than about 4 millimeters and greater than about 0.05 millimeters.

6. The foam of claim 1, wherein the foamed product has a cell size of less than about 1.5 millimeters.

7. The foam of claim 1, wherein the foamed product is in the form of individual coalesced strands.

* * * * *

UNITED STATES PATENT AND TRADEMARK OFFICE
CERTIFICATE OF CORRECTION

| | | |
|---|---|---|
| PATENT NO. | : | 5,527,573 |
| DATED | : | June 18, 1996. |
| INVENTOR(S) | : | Chung P. Park and Bruce A. Malone |

It is certified that error appears in the above-identified patent and that said Letters Patent is hereby corrected as shown below:

In item 22 on the cover page "Jun. 4, 1994" should read --Jun. 14, 1994--

Column 21, Line 1, "foamalbility" should read --foamability--

Column 21, Line 11, "The foam product" should read --The foam--

Column 21, Lines 11/12, "foamed product" should read --foam--

Column 22, Line 1, "The foamed product" should read --The foam--

Column 22, Line1/2, "foamed product" should read --foam--

Column 22, Line 4 "foamed product" should read --foam--

Column 22, Line 7 "foamed product" should read --foam--

Column, 22, Line 9 "foamed product" should read --foam--

Signed and Sealed this

Ninth Day of September, 1997

*Attest:*

BRUCE LEHMAN

*Attesting Officer*     *Commissioner of Patents and Trademarks*